(12) United States Patent
Cliff

(10) Patent No.: US 6,344,607 B2
(45) Date of Patent: Feb. 5, 2002

(54) AUTOMATIC COMPILATION OF SONGS

(75) Inventor: David Trevor Cliff, Southville (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/805,170

(22) Filed: Mar. 14, 2001

(30) Foreign Application Priority Data

May 11, 2000 (EP) .............................................. 00303960

(51) Int. Cl.[7] .............................. G10H 1/40; G10H 7/00
(52) U.S. Cl. .............................. 84/611; 84/635; 84/484
(58) Field of Search .......................... 84/611, 612, 635, 84/636, 47 OR, 484, 411 P (56) References Cited

U.S. PATENT DOCUMENTS

| | | | |
|---|---|---|---|
| 5,747,716 A | 5/1998 | Matsumoto | 84/609 |
| 5,824,933 A | * 10/1998 | Gabriel | 84/609 |
| 5,969,283 A | 10/1999 | Looney et al. | 84/609 |
| 6,066,792 A | * 5/2000 | Sone | 84/609 |

FOREIGN PATENT DOCUMENTS

EP 0 932 157 7/1999

OTHER PUBLICATIONS

MixMeister 3 User Guide, Mixmeister Technology.*
ZDNet Downloads, MixMeister 3.02 Review, Jul. 18, 2000.*
MixMeister 2.02 User Manual, Mixmeister Technology.*
Dasound.com, MJ–Studio description, Sep. 12, 1999.*
Mixman Studiopro 4.0 PC User Guide.*
Harmony–Central Software Abstracts, Mixman Studio Demo, Jun. 12, 1999.*
Patent Abstracts of Japan, No, 11065565, Music Reproducing Device And Music Reproducing Control Program Record Medium (Mar. 09, 1999).

* cited by examiner

Primary Examiner—Jeffrey Donels (57) ABSTRACT

A method of automatically producing a compilation mix from a set of songs is disclosed. The method comprises the steps of generating (22) a beat profile comprising a temporal map representing an ideal rate of repeat of the dominant beat for the compilation mix at different points in time over the duration of the compilation, generating (21) at least one set of song data indicative of the rate of repeat of the dominant beat for each of the songs in the set of songs, and allocating (24) the songs temporally within the compilation mix by processing the song data together with the temporal map, the songs being located temporally with respect to one another such that the rate of repeat of the dominant beat of the compilation approximates that indicated by the temporal map and end portions of adjacent songs overlap.

32 Claims, 8 Drawing Sheets

AUTOMATIC COMPILATION OF SONGS

This invention relates to a method and an apparatus for producing a compilation of overlapping songs, each song in the compilation having a sequence of repeating beats. The compilation may, for instance, be suitable for recording onto a data carrier such as a compact disc, or for broadcast by a radio station.

It will be understood that by song we mean any musical song or tune, with or without a vocal element, and with or without elements of melody and harmony, where the rhythmic element of the music is characterised by repetitive beats. The invention is especially but not exclusively suitable for compilations of dance music, which is generally characterised by a continuous repetitive sequence of beats. The beat is important for dance music and usually dominates the overall subjective impression provided by the song.

It is well known to manually produce a compilation by "mixing" together a set of individual songs, usually dance music songs, to form a single continuous track in which one song is merged seamlessly into the adjacent song or songs. The resulting compilation comprises an apparently continuous stream of music.

At present, the production of such "compilations" (sometimes referred to as "mixes") have required many hours work by skilled Disk Jockeys (DJ's). The job of a DJ involves great skill in deciding on the order of the songs, (the "sequence") and also skill in seamlessly mixing one track into the other. The amount of time and skill needed puts the production of compilation mixes beyond the abilities of most listeners.

We are aware of European patent application No. EP 0932157A1. This document describes an apparatus and method for automatically performing a cross-over between two songs which are played back consecutively. As soon as the start of a pre-determined end part of the first song is detected, this end part is played simultaneously with a pre-determined beginning part of the second song. After play-back of the end part concludes, the play-back continues for the second song only. During simultaneous play-back a fade-out and/or a fade-in may be performed for the end part and/or the begin part respectively.

The apparatus known from EP 0932157 has problems in that it requires, as a pre-requisite, that two songs are provided which include markers for the end part and begin part. Most, if not all songs, can not be purchased with suitable markers allocated to them for use by such an apparatus. It is not taught how such markers are established, and presumably a skilled operator is needed in order to set the markers prior to play back and choose the sequence of the songs.

An object of the present invention is to produce a method and apparatus for the production of a compilation mix of songs which does not require the presence of pre-established markers and provides for greater flexibility.

According to the present invention, a method of automatically producing a compilation mix from a set of songs is provided, the method comprising the steps of:

(a) generating a beat profile comprising a temporal map representing an ideal rate of repeat of the dominant beat for the compilation mix at different points in time over the duration of the compilation;

(b) generating at least one set of song data indicative of the rate of repeat of the dominant beat for each of the songs in the set of songs, (c) allocating the songs temporally within the compilation mix by processing the song data together with the temporal map, the songs being located temporally with respect to one another such that the rate of repeat of the dominant beat of the compilation approximates that of the temporal map and end portions of adjacent songs overlap.

The invention thus provides a method of automatically determining the sequence of the songs according to their rate of repeat of the dominant beat (the tempo—usually measured as beats per minute) and an ideal temporal map for the resulting compilation. This enables the production of effective compilations with a predetermined overall feel to be achieved from any set of songs.

The invention may include a preliminary step of selecting the set of songs to form the compilation mix from one or more master sets of songs.

The method step (a) may comprise the sub-steps of selecting a beat profile from a set of different predetermined beat profiles. The predetermined beat profiles may be stored within an area of memory.

The beat profile may comprise a quantitative map of the ideal beat repetition rate throughout the duration of the compilation to be constructed. It may comprise a set of beat rate values and corresponding time values for a compilation.

Alternatively, the temporal beat profile may be a qualitative map in which relative values of the beat repetition rate at various time locations in the compilation are provided. For instance, the map may consist of the location in time in the compilation of where the maximum and minimum rates should be, and the change in rate between these points.

The time information in the map may also be either quantitative, i.e. from zero to 74 minutes or qualitative, i.e. from "start" to "finish".

The beat profile may be stored as a set of pairs of data, each pair consisting of a time location in the compilation and either a quantitative or qualitative value of the beat repetition rate.

The predetermined beat profiles may all be of a predetermined duration. In that case, the method may further comprise the steps of temporally expanding or compressing the selected profile to match the length of the compilation mix that is being produced.

The step of selecting the beat profile may be automatically performed by the method. A beat profile may, for example, be selected at random from a set of profiles.

Alternatively, the beat profile may be entered or selected manually by a user. The method may therefore include a sub-step of requesting a user to enter or to select a beat profile.

The step (b) of generating song data may comprise processing each song that is selected to produce a beat value representative of the rate of repetition of the dominant beat of the song.

Typically, the beat repetition rate (tempo) of a song will remain substantially constant over the duration of the song. The beat repetition data for each song may therefore comprise a step of, for each song, measuring the beats per minute of only one part of the song. This may, for instance, be a start portion, a middle portion or an end portion of the song.

It may also include the step of processing each song to produce a time value indicative of the overall duration of the song from start to finish.

It may additionally or alternatively include the step of identifying the location of any beat drop-outs within each song. These represent points in the song where the beat stops before restarting. For instance, in a dance music song it may be a point at which a drum beat defining the dominant beat stops for a few beats or measures before restarting.

The generated song data may be stored in individual data files corresponding to each song or in a single file.

The beat profile may be used to calculate the value and the temporal position of the minima and maxima beat rates in the profile. Data indicative of the value and position may be stored in a memory. In some arrangements, the temporal map may already be stored in terms of minima and maxima, and so this processing is not required.

The songs may be allocated to their temporal positions within the compilation such that the songs having the minima and maxima beat per minute are located at the point in the sequence corresponding approximately to the position of the minima and maxima of the temporal map.

The remaining songs may be allocated to the remaining positions in the compilation mix to complete the sequence by matching the beat rates of the songs to the temporal profile using a "best-fit" approximation.

The allocation may be made by processing the song data in combination with the temporal map.

It is expected that in many applications of the present invention the duration of the created compilation will be required to be no greater than some maximum time-duration M seconds. For example, in creating a compilation to be written to a standard length compact disc (CD), the CD format imposes a maximum duration of 74 minutes (M=4440 seconds). In a broadcast application the compilation mix may have to fit into a precise time slot (i.e.12:05 to 1:00 am) and so the maximum time in this case would be 55 minutes.

To create a continuous/seamless mix, the songs in the compilation need to be overlapped so that the mix can cross-fade from one song to another. A variety of overlaps are envisaged within the scope of the present invention.

The method may therefore comprise the further step of, after allocating the songs to the temporal map to determine the order of the songs, locating the songs relative to one another in time such that the songs overlap in a predetermined manner.

The predetermined amount of overlap between songs may initially be chosen to be the same for each song.

For a set of N songs, with total combined length T seconds, the initial amount of overlap L between each song may be automatically determined from the relative values of M and T. If T is greater than M, there is more music than can be fitted into the time duration so each song may be overlapped by an equal amount determined by the equation:

$$L=(T-M)/(N-1).$$

Subsequent to the generation of the initial overlap, the individual overlap between pairs of songs may be adjusted. For example, where the song data indicates that a beat drop out is present in a song, this may be used as the point at which the song ends and the subsequent song begins. In that case, the decision to provide equal overlap may be overruled.

After initial overlap of the songs, the method may further comprise the step of processing the songs so that the beats occurring in the overlap section from each song are aligned temporally.

This step may comprise the step of phase aligning the overlapping songs so that the dominant beats of each song are exactly aligned. Thus, the beats of each song will occur at the same time and to the listener will appear as a single beat.

The dominant beats in the overlap can only be aligned throughout the entire overlap portion if they are at the same repetition rate.

The method may therefore include the step of time-stretch and/or time-compression processing one or both of the overlapping portions to match the rate of repetition. This may be achieved by speeding up one song in the overlap region, or slowing down one song, or a combination of both.

Where the method comprises the step of speeding up/slowing down an overlapping portion of a song, the method may further comprise the step of gradually adjusting the speed of the remainder of the song over time to bring it back to its nominal (pre-adjusted) beat repetition rate. The human ear is not especially good at identifying slow changes in tempo over time, and so such adjustment can be made without the user noticing in the final compilation.

After the songs have been aligned the subsequent alterations to the overlaps may require that the overall length of the resulting compilation exceeds the allocated duration, i.e. exceeds M seconds. In such a case, the method may further comprise the step of automatically truncating the compilation by fading out the final song early (before its end) or fading in the first song late (after its start), or by a combination of both.

The same step of early/late fade can also be applied if the duration of any one of the calculated overlaps exceeds a predetermined value L. This can arise if the overlap is aligned using a drop-out that occurs some way into a song. The value of L may be quantitative, i.e. 30 seconds, or qualitative, i.e. 30 percent of the duration of a song. Thus, if the overlap exceeds the predetermined threshold an appropriate fade-out, fade-in or both may be used to lower the overlap to within the threshold.

If no maximum time limit is set, the overlap may be chosen at random or set to some predetermined initial value, say 20 seconds. This may also be used where the total length T of the songs for the compilation are less than the predetermined limit M. The value of the overlap may be selected as a function of the length of the songs being compiled, for example as a percentage of the length of an outgoing song, as a percentage of a length of an incoming song, or as a percentage of the average length of the songs being overlapped. This percentage could be fixed or generated at random from a probability distribution.

The method may further include the step of fading out the amplitude (volume) of the overlapping end portion of a song. The method may also include the step of fading in the overlapping start portion of a song. A linear increase in amplitude may be provided or it may be faded in accordance with any other predetermined pattern.

The method may further comprise the step of recording the songs in their selected order over time onto a data carrier, such as a compact disc.

According to a second aspect, the invention also provides apparatus adapted to automatically produce a compilation mix of songs in accordance with the method of the first aspect.

The apparatus may include a first area of memory in which the songs to be compiled are stored, a processing unit which processes the data in the memory, a computer program which, when run on the processor instructs the processor to perform the method of the first aspect of the invention.

A second area of memory may be provided in which one or more user defined beat profiles are stored for access by the processor.

The apparatus may further include a connector for connection to an output storage device adapted to record the resulting compilation on a storage data carrier. The storage device may comprise a compact disc writer.

The apparatus may include a data input device whereby a user may select the temporal profile in response to a prompt by the apparatus. The apparatus may produce an audio or visual prompt.

According to a third aspect, the invention provides a data carrier including a computer program which, when operating on a computer, produces an apparatus according to the second aspect of the invention.

Figure 1:
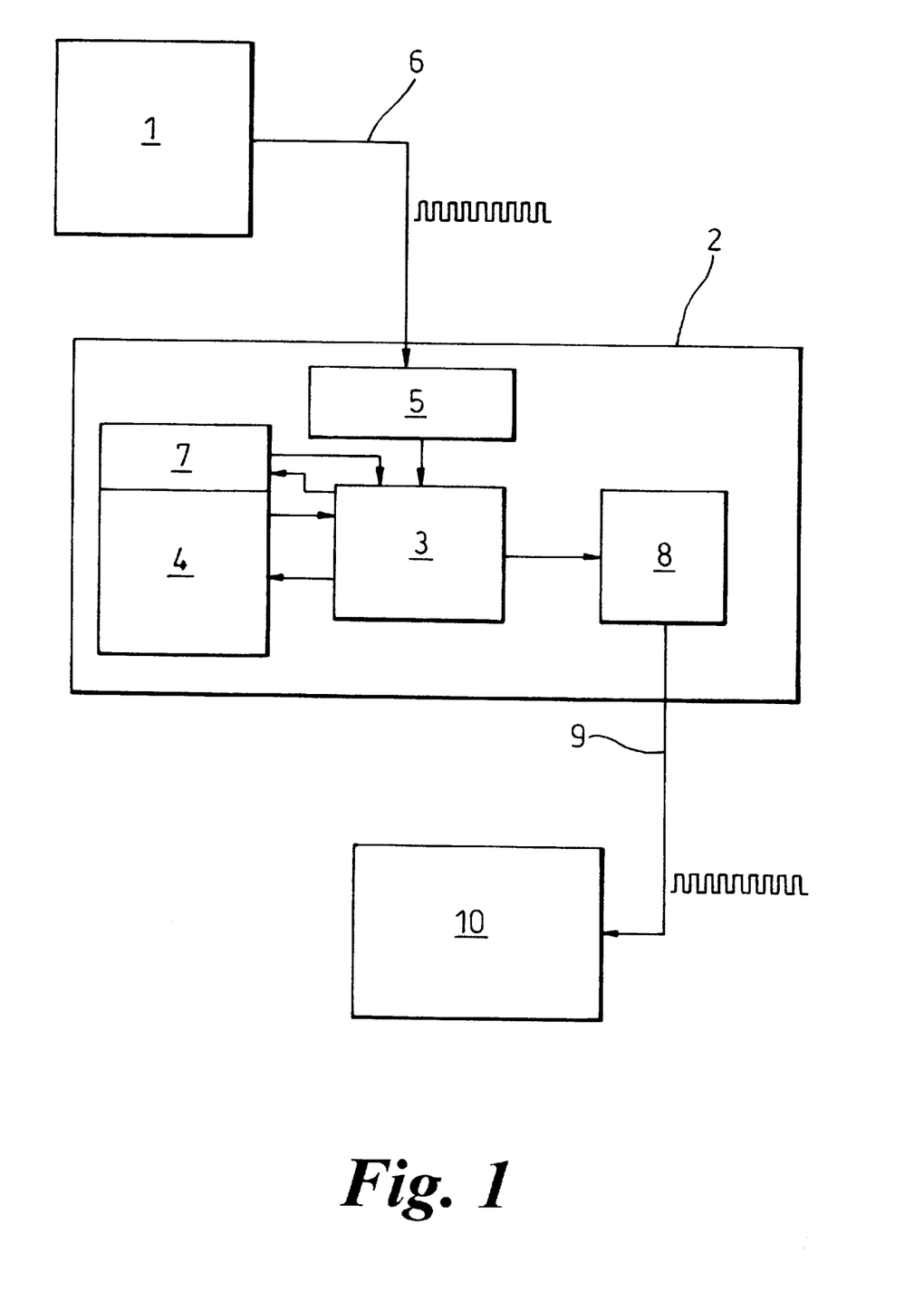
FIG. 1 is a schematic of an apparatus in accordance with the present invention for automatically producing a compilation of songs.

There will now be described, by way of example only, one embodiment of the present invention with reference to the accompanying drawings, of which:

FIG. 1 is a schematic diagram of an apparatus in accordance with one aspect of the present invention.

The apparatus comprises three main functional elements. Firstly, a memory storage area 1 is provided which stores, in either digital or analogue form, a number of songs from which a compilation mix is to be made. As shown, this comprises a compact disc player which reads compact discs on which songs are recorded in a digital format. The storage may alternatively or additionally comprise a solid state electronic memory, and/or magnetic storage such as a number of hard drives and/or magnetic tape drives. Any combination of these and other storage technologies are appropriate.

A compilation generation apparatus 2 is provided, which includes a central processing unit 3 and a first area of memory 4 which stores a program that provides operating instructions to the central processing unit 3. The apparatus further includes an input port 5 which is connected to the memory storage area 1 whereby the central processing unit 3 can download the song data from the storage area. In the example, the compilation apparatus 2 is located in the same room as the memory storage area 1, and is connected through a conductive cable 6, such as a copper cable. Optical connections could be used, and it is envisaged that the storage area may be located in a different geographical area for access over the telephone network using a modem.

The compilation generation apparatus 2 further includes an intermediate memory buffer 7 into which the songs to be compiled are stored prior to processing, and into which song data produced by processing the songs can be stored.

An output port 8 is also provided with enables the final compilation mix in the intermediate memory 7 to be passed along a cable 9 to a storage device such as a CD writer 10.

It will be appreciated that the compilation generation apparatus may be embodied as a personal computer in which case it will further include an input device (not shown) for receiving commands from a user and a display (not shown).

The apparatus automatically produces a compilation by performing the steps illustrated in the flow charts of FIGS. 2 to 7 of the accompanying drawings.

Figure 2:
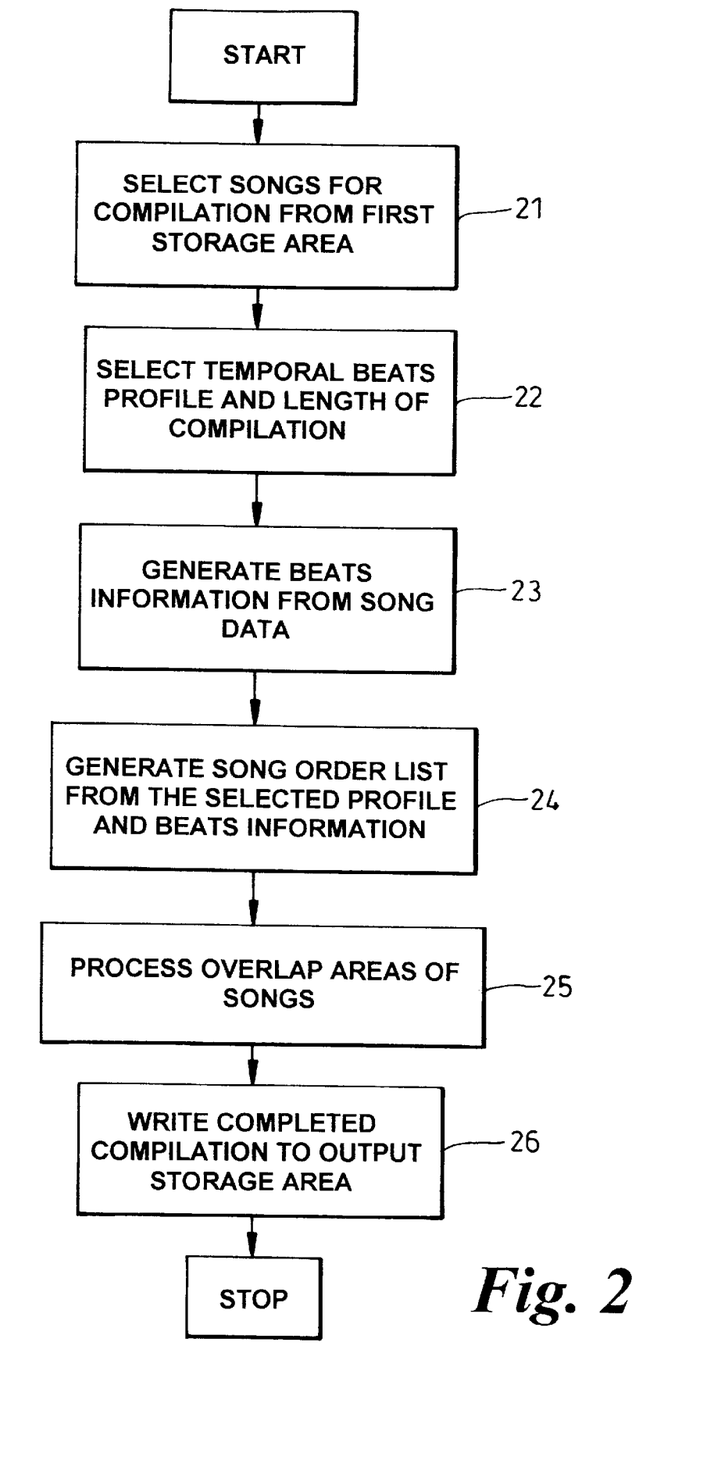
FIG. 2 is a general flow diagram of the overall method carried out by the apparatus of FIG. 1.

FIG. 2 is a flowchart which gives an overview of the key steps performed in the compilation method performed by the apparatus of FIG. 1 of the accompanying drawings.

In a first step 21, the songs which will make up the finished compilation mix are selected from those stored in the first storage area 1. Subsequently, a temporal beat profile is selected 22 for the finished compilation. This profile provides a template for the finished compilation and determines the mood of the finished compilation. Several different profiles may be provided.

Figure 8A:
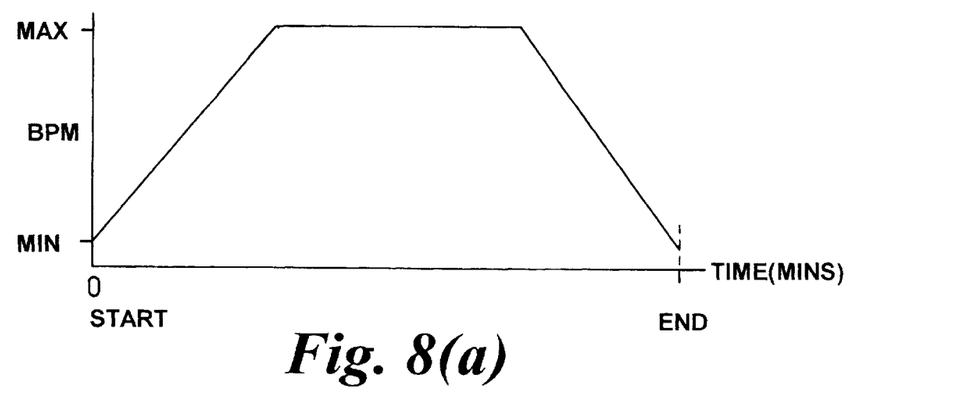
FIG. 8 is a diagram showing three typical beat profiles.
Figure 8B:
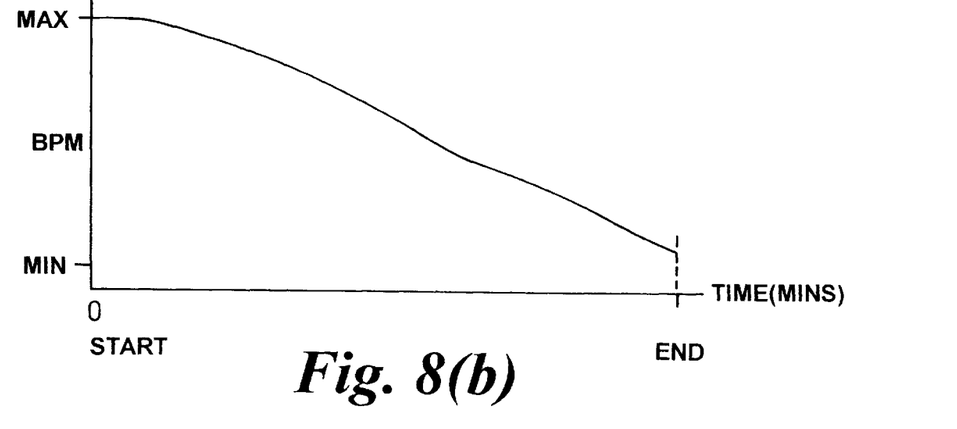
Figure 8C:
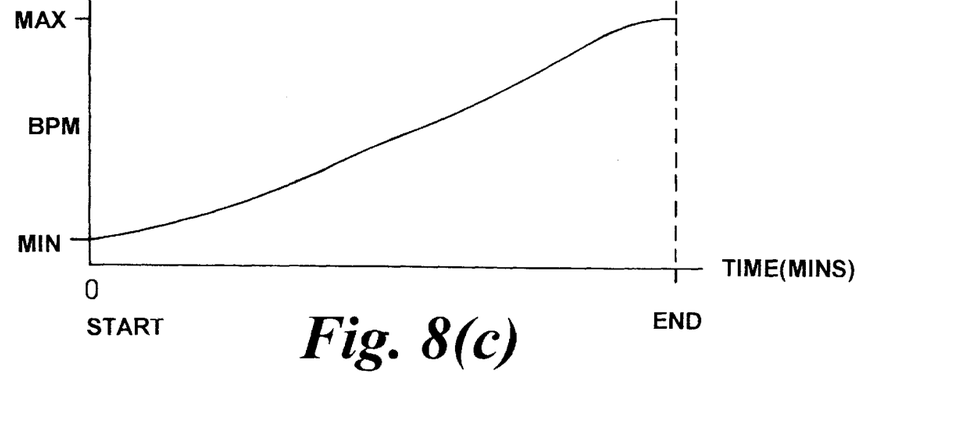

FIGS. 8(a) to 8(c) illustrate three possible profiles. Each illustration plots a qualitative value of beats per minute (bpm) against time over the length of the compilation. In FIG. 8(a), the bpm starts at a lower value, designated "minimum". This gradually increases over time to a "maximum" value, and then decreases towards the end. In FIG. 8(b) the bpm starts at a "maximum" value and gradually falls. In FIG. 8(c) it starts at a minimum and gradually increases over time. In each case, the profile covers a time span from "start" to "stop". The profile can thus be scaled, for example to correspond to the maximum run-time of a standard format compact disc.

Having selected the desired "ideal" profile, the selected songs are next classified 23 to generate a set of song data. A data record is generated for each song in which is recorded the average bpm of the song, its run-time (length) and the location of any drop-outs in the song.

In the next step, the songs are allocated 24 to the profile to determine the order in which the songs will play in the finished compilation. This is performed by comparing the song data in the data records with the temporal profile that has been selected to provide a best fit. This ensures the bpm of the compilation follows, as closely as possible, the ideal bpm profile.

After allocating a play order of the songs, the amount of overlap between songs is calculated and the overlapping portions are processed 25 to provide a seamless transition between songs.

Finally, the processed set of songs is output 26 to the storage area for recording onto the compact disc by the compact disc writer.

Each of the steps is performed automatically and is illustrated in more detail in the flow charts of FIGS. 3 to 7 and is described below.

Figure 3:
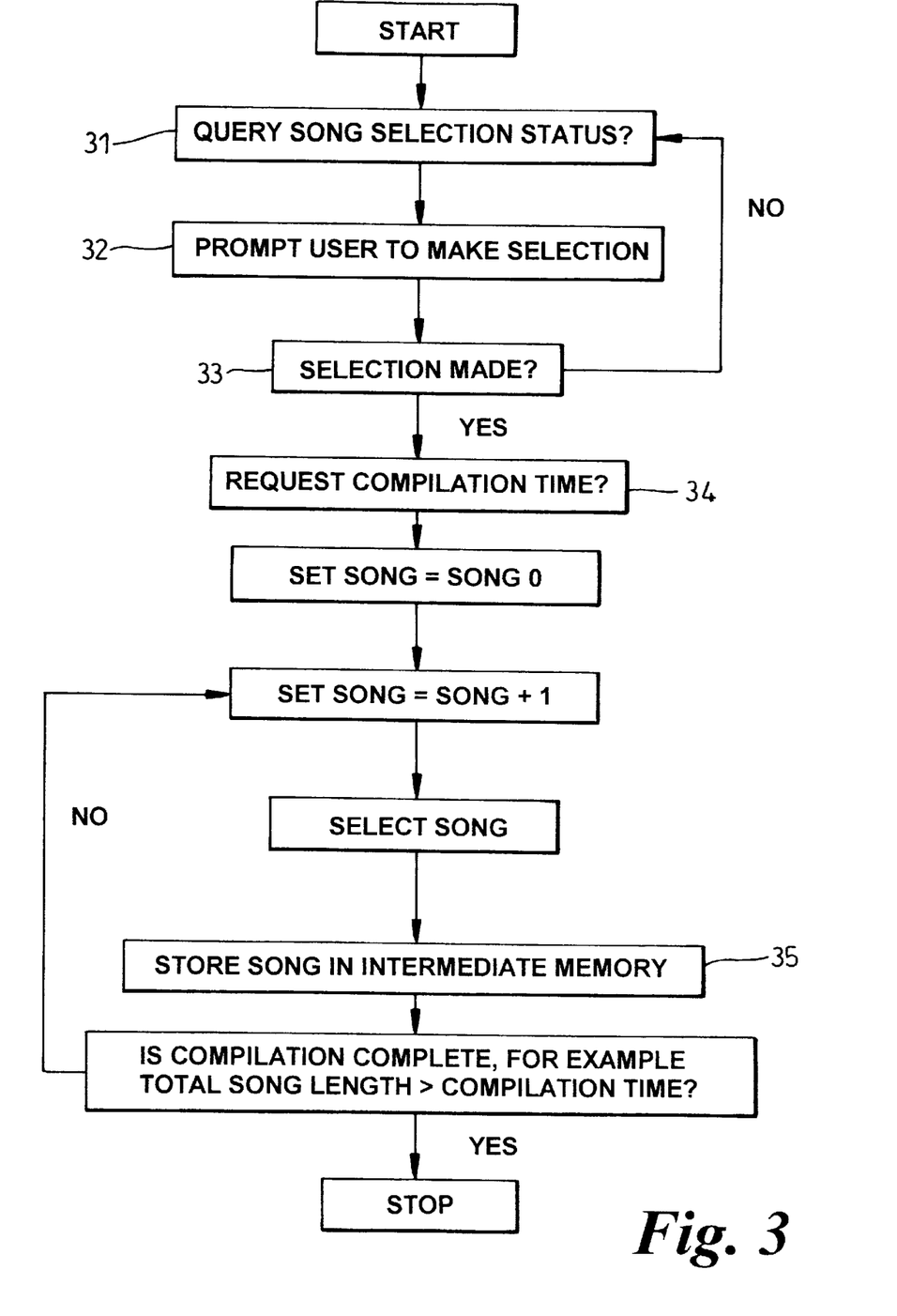
FIG. 3 is a flow diagram illustrating the steps involved in selecting the songs to be used in constructing the compilation mix.

The step of selecting songs 21 is represented schematically in FIG. 3 of the accompanying drawings.

Song selection can be made either manually by a user who selects from a list or automatically. Initially, the apparatus queries 31 whether manual or automatic selection is required.

If manual selection is required, the user is next prompted 32 to select a song. A list of songs from which the selection is to be made may be displayed or a prompt may be made for the user to provide a song. For example, following the prompt, the user may load a compact disc containing the song into the CD player.

Once a selection has been made 33 (from a list or providing a disc), the selected song is stored 35 in intermediate memory. The song itself may be recorded in the memory, or a marker may be stored which points to the location of the selected song.

The total run-time of the compilation mix is also requested 34. This may be entered by a user from a prompt or may be a default value. For example, for a compact disc the default of 74 minutes may be used. For a compilation for play on a radio show, other lengths may be stored.

The apparatus continues to request songs to be selected until the user indicates that the selection is complete or until the length of the songs when played end-to-end exceeds the requested run-time. The selection is then complete. After selection, a complete set of songs, or markers pointing to the location of songs, is stored in the intermediate memory.

Figure 4:
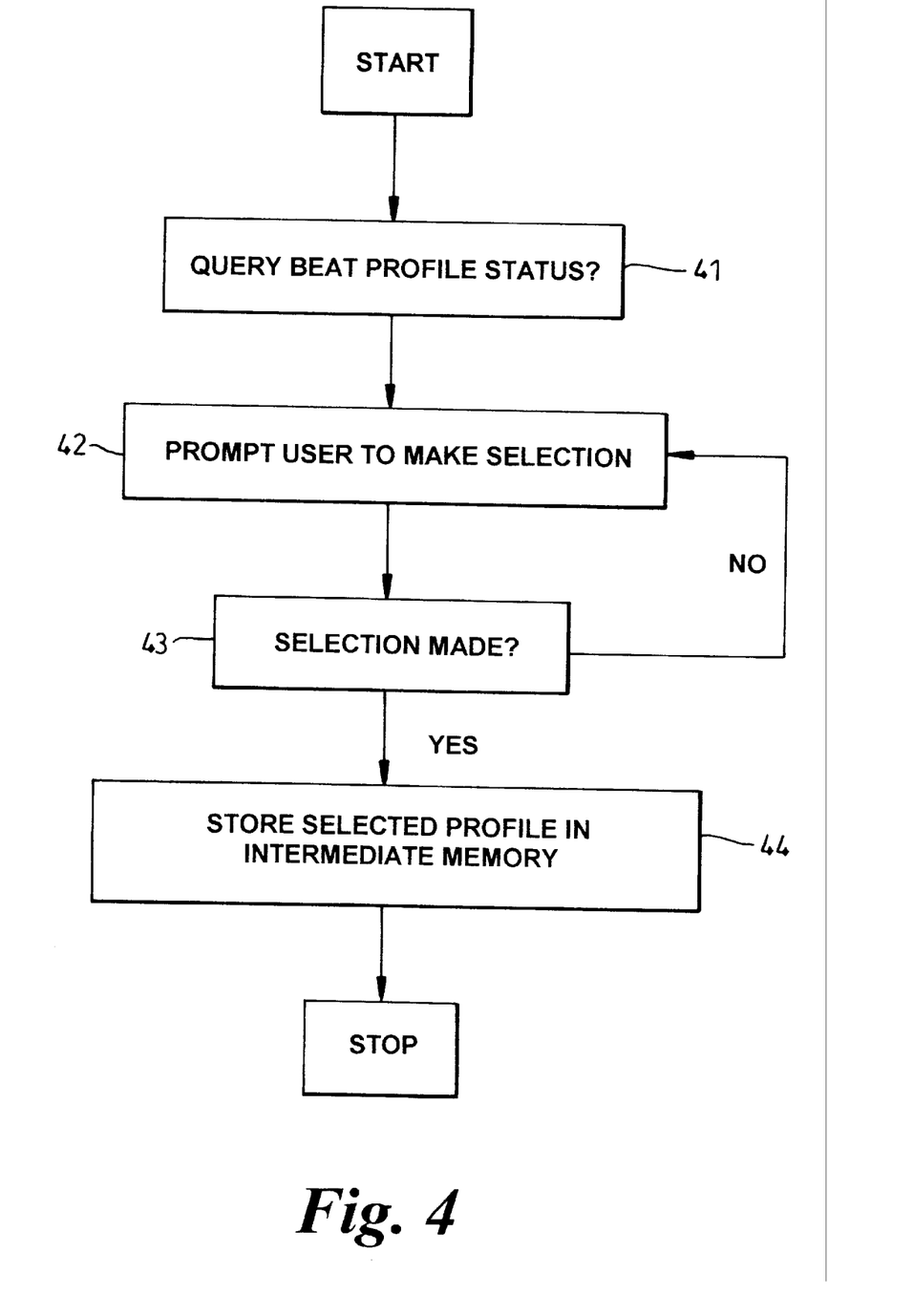
FIG. 4 is a flow diagram illustrating the steps of calculating the temporal profile of the compilation mix.

The temporal beat profile is next calculated or selected, as illustrated in the flow chart of FIG. 4 of the accompanying drawings. Again, a profile may be selected automatically or manually by a user. The apparatus therefore initially queries 41 the selection status. A set of profiles is stored in memory and identified by an appropriate label, i.e. profile A, profile B, profile C, etc. j The apparatus prompts 42 the user to select an appropriate profile by entering the label relating to the profile from the input device.

If automatic selection is requested, the profile is either chosen at random or a default profile is used. This profile is then stretched/compressed temporally to fit the length of the compilation required.

Once a profile has been selected 43 it is stored in memory or the label identifying the selected profile is recorded 44.

Figure 5:
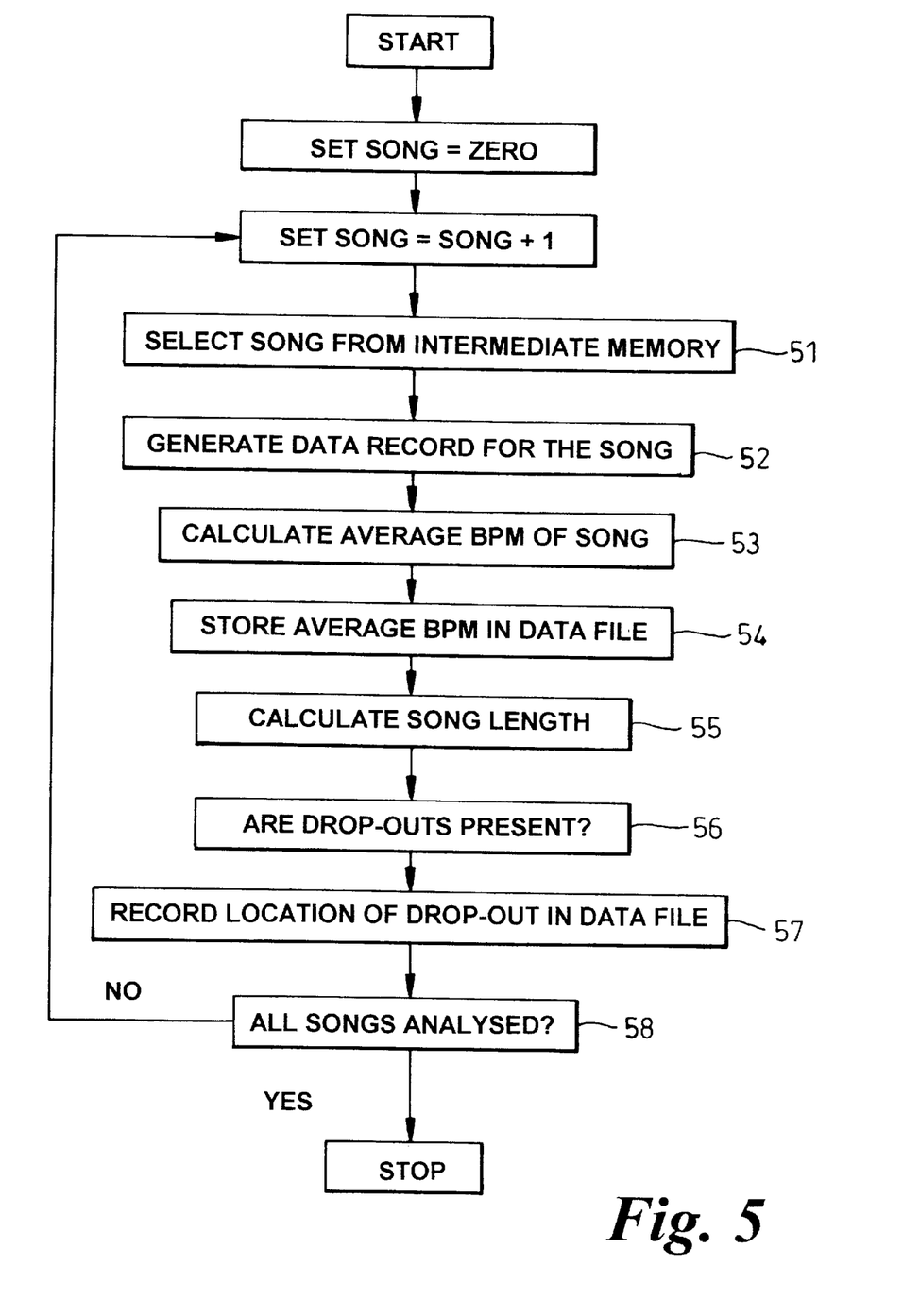
FIG. 5 is a flow diagram illustrating the steps of calculating the song data for storage in data files.

In the next step, illustrated in more detail in the flow chart of FIG. 5, the selected songs are analysed to generate a set of data records. For each song 51 a blank data file is first produced 52. The average rate of repetition of the dominant beat of the song is calculated 53 and stored 54 in the data file for the respective song. The temporal length of the song is calculated and stored 55, and the temporal location within the song of any drop-outs is calculated 56 and stored 57 in the data file. After analysing the first song, the process is repeated 58 until all songs are analysed and a full set of data files has been produced.

Figure 6:
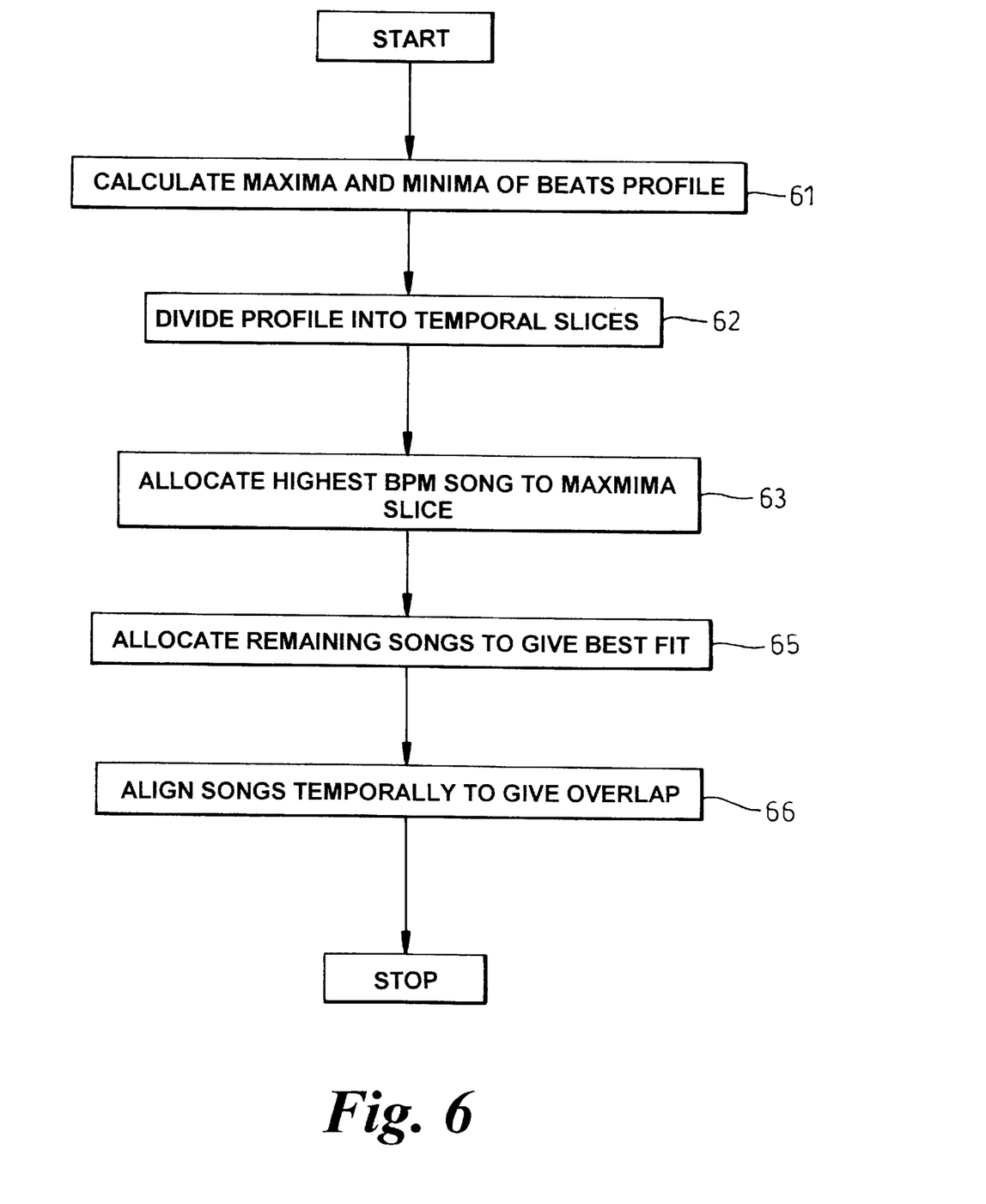
FIG. 6 is a flow diagram illustrating the steps of allocating the songs to temporal locations within the compilation.

The selected temporal profile and the data files are used to arrange the order of the songs in the completed compilation mix as best illustrated in the flow chart of FIG. 6 of the accompanying drawings.

The profile is first analysed 61 to calculate the ideal temporal position of the highest and lowest beats per minute. The profile is then divided 62 into N temporal slices, each slice being ranked in order by the beats per minute value in the profile.

The slice having the highest beats per minute is then matched 63 to the song whose data file indicates it has the highest beats per minute. Similarly, the slice with the lowest beats per minute is matched 64 to the song whose data file has the lowest bpm.

The remaining songs are then allocated 65 to the profile so as to provide a "best-fit" solution before the songs are aligned 66.

If all the songs are the same length, the temporal profile is divided into equal width slices, the width of the slice being equal to the length of a song. In that case, songs are fitted directly to the slots with a small amount of overlap.

Alternatively, the highest and lowest bpm songs may be "centred" around the maxima and minima in the profiles. The remaining songs are then fitted into the profile and the songs are re-aligned to provide the smallest overlap between songs. The overlaps may be made equal length.

Having arranged the songs into an approximate run-time order, and roughly overlapped the songs, the overlapped portions are next processed to provide a seamless transition between songs. This is illustrated in the flow chart of FIG. 7 of the accompanying drawings.

Figure 7:
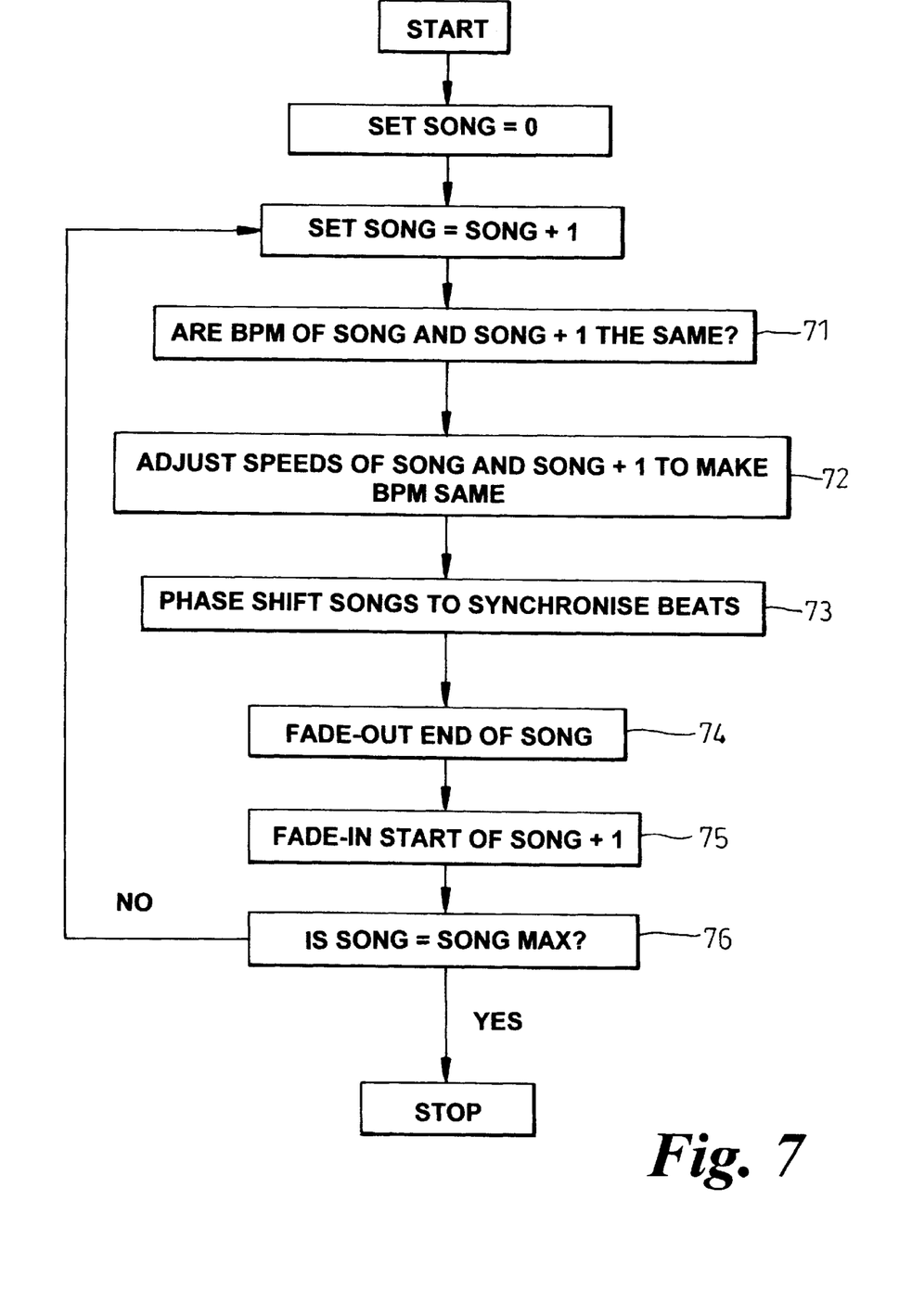
FIG. 7 is a flow diagram of the steps for providing seamless transitions between songs.

Initially, the first two songs allocated to the sequence are selected, and the areas of overlap are analysed. The apparatus checks 71 to see if the bpm value data in the two data files is the same. If not, then the two overlapping portions are processed 72 by either time-compressing to speed up or time-stretching to slow down one or both of the songs until their tempos are matched.

After ensuring the beats match, the phase of the two end portions are aligned 73. This is achieved by moving the two songs temporally until the beats coincide.

Having aligned the two songs, a fade is then applied to both songs. The end of the first song is faded out 74, whilst the start of the next song is faded in 75. This can be achieved by allocating an amplitude profile to the songs which is stored in the data file for the song. The data record contains this information alongside the information indicating where the songs start and finish.

If the speed of an overlap portion has been adjusted, the songs are next processed so that the speed returns to its normal value throughout the song.

The process is again repeated 76 if required until all the songs have been processed.

Finally, the data held in the data files, which provides a full indication of the temporal alignment, phase adjustment, and amplitude data for fading is used to record the completed compilation mix onto the CD in the CD writer. In an alternative, the details may be written to the CD writer alongside a set of separate tracks. On play-back, the data file is used to control the order and timing of play-back so that a full compilation mix is heard.

What is claimed is:

1. A method of automatically producing a compilation mix from a set of songs comprising the steps of
   (a) generating a beat profile comprising a temporal map representing an ideal rate of repeat of the dominant beat for the compilation mix at different points in time over the duration of the compilation;
   (b) generating at least one set of song data indicative of the rate of repeat of the dominant beat for each of the songs in the set of songs,
   (c) allocating the songs temporally within the compilation mix by processing the song data together with the temporal map, the songs being located temporally with respect to one another such that the rate of repeat of the dominant beat of the compilation approximates that indicated by the temporal map and end portions of adjacent songs overlap.

2. A method according to claim 1 which further includes a step of selecting the set of songs to form the compilation mix from one or more master sets of songs.

3. A method according to claim 2 in which step (a) includes the sub-step of selecting a beat profile from a set of different predetermined beat profiles.

4. A method according to claim 3 in which step (b) comprises processing each song that is selected to produce a beat value representative of the rate of repetition of the dominant beat of the song.

5. A method according to claim 1 which further includes the step of processing each song to produce a time value indicative of the overall duration of the song from start to finish.

6. A method according to claim 1 which additionally includes the step of identifying the location of any beat drop-outs within each song.

7. A method according to claim 1 in which the beat profile is processed to calculate the value and the temporal position of the minima and maxima beat rate in the profile, the songs being allocated to their temporal positions within the compilation such that the songs having the minima and maxima beat per minute are located at the point in the sequence corresponding approximately to the position of the minima and maxima of the temporal map.

8. A method according to claim 7 in which the remaining songs are allocated to the compilation mix to complete the sequence by matching the beat rate of the songs to the temporal profile using a "best-fit" approximation.

9. A method according to claim 8 in which, subsequent to allocating the songs to the temporal map to determine the order of the songs, the songs are located relative to one another in time such that the songs overlap in a predetermined manner.

10. A method according to claim 9 in which the predetermined amount of overlap between songs is chosen to be the same for each song.

11. A method according to claim 10 where the song data indicates that a beat drop out is present in a song, the drop-out is used as the point at which the song ends and the subsequent song begins.

12. A method according to claim 11 in which the songs are located temporally so that the dominant beats occurring in the overlap section from each song are aligned temporally.

13. A method according to claim 12 in which one or both of a pair of overlapping portions are processed to match their rate of beat repetition by speeding up one song with time-compression in the overlap region, or slowing down one song with time-stretching, or a combination of both.

14. A method according to claim 13 which further comprise the step of gradually returning the speed of the remainder of the song over time to bring it back to its nominal (pre-adjusted) beat repetition rate.

15. A method according to claim 1 which further includes the step of fading out the amplitude (volume) of the overlapping end portion of a song and/or fading in the overlapping start portion of a song.

16. An apparatus adapted to automatically produce a compilation mix of songs.

17. Apparatus adapted to automatically produce a compilation mix of songs, which includes a first area of memory in which the songs to be compiled are stored, a processing unit which processes the data in the memory, and a computer program which, when run on the processor instructs the processor to perform the steps of:
  (a) generating a beat profile comprising a temporal map representing an ideal rate of repeat of the dominant beat for the compilation mix at different points in time over the duration of the compilation;
  (b) generating at least one set of song data indicative of the rate of repeat of the dominant beat for each of the songs in the set of songs;
  (c) allocating the songs temporally within the compilation mix by processing the song data together with the temporal map, the songs being located temporally with respect to one another such that the rate of repeat of the dominant beat of the compilation approximates that indicated by the temporal map and end portions of adjacent songs overlap.

18. Apparatus according to claim 17 which further includes a connector for connection to an output storage device adapted to record the resulting compilation on a storage data carrier.

19. Apparatus according to claim 18 which further includes a data input device whereby a user may select the temporal profile in response to a prompt by the apparatus.

20. An apparatus for enabling automatic generation of a compilation mix from a plurality of songs, the apparatus comprising:
  at least one memory containing a plurality of songs operable to be compiled and at least one map of a demanded variation in dominant beat frequency over a period of time; and
  a processor adapted to: establish for each of said plurality of songs the dominant beat frequency; and to sequence said plurality of songs to provide correspondence between the at least one map and relative variation in dominant beat frequency of the songs.

21. The apparatus according to claim 20, wherein a plurality of maps are stored in the at least one memory.

22. The apparatus according to claim 20, wherein the processor is operable to synchronize dominant beats of overlapping portions of adjacent songs in the compiled plurality of songs by altering the dominant beat frequency of at least one adjacent song.

23. The apparatus according to claim 22, wherein the processor is operable to gradually return the dominant beat frequency of the at least one song to a dominant beat frequency for the at least one adjacent song prior to being altered.

24. The apparatus according to claims 20, further comprising an output port to enable connection to a storage device, operable to store the compiled plurality of songs.

25. A method of automatically generating a compilation mix from a plurality of songs comprising the steps of:
  creating at least one map of demanded variation in dominant beat frequency over a period of time;
  establishing for each of the plurality of songs the dominant beat frequency; and
  sequencing the plurality of songs to provide correspondence between relative variation in the dominant beat frequency of the songs and the at least one map.

26. The method according to claim 25, further comprising the step of selecting the plurality of songs from at least one master set of songs.

27. The method according to claim 25, wherein the step of compiling further comprises: using a beat fit approximation to match the dominant beat frequency of each of the plurality of songs with demanded variation in dominant beat frequency of the at least one map.

28. The method according to claim 27, wherein the step of compiling further comprises:
  determining which songs of the plurality of songs have the highest and lowest dominant beat frequency;
  determining which points on the at least one map have the highest and lowest demanded dominant beat frequency; and
  matching the highest dominant beat frequency song to a point on the at least one map with the highest demanded beat frequency, and matching the lowest dominant beat frequency song to a point on the at least one map with the lowest demanded beat frequency.

29. The method according to claim 25, further comprising the step of synchronizing dominant beats of overlapping portions of adjacent songs in the compiled plurality of songs by altering the dominant beat frequency of at least one adjacent song.

30. The method according to claim 29, further comprising the step of gradually returning the dominant beat frequency of the at least one adjacent song to a dominant beat frequency of said at least one adjacent song prior to being altered.

31. The method according to claim 25, wherein said step of compiling further comprises overlapping the plurality of songs in a predetermined manner.

32. The method according to claim 31, wherein the predetermined manner is the same amount of overlap for each adjacent pair of songs.

* * * * *